(12) United States Patent
Volchegursky et al.

(10) Patent No.: US 9,256,473 B1
(45) Date of Patent: Feb. 9, 2016

(54) PROVISION A VIRTUAL ENVIRONMENT BASED ON TOPOLOGY OF VIRTUAL NODES, NODE DEPENDENCIES AND BASE NODE CONFIGURATION INFORMATION

(71) Applicant: EMC Corporation, Hopkinton, MA (US)

(72) Inventors: Dmitry Volchegursky, Pleasanton, CA (US); Dmitry Limonov, Dublin, CA (US); Boris Shpilyuck, Dublin, CA (US); Alex Rankov, Danville, CA (US); Pavel Balan, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 468 days.

(21) Appl. No.: 13/627,671

(22) Filed: Sep. 26, 2012

(51) Int. Cl.
*G06F 9/50* (2006.01)
*G06F 9/455* (2006.01)
*G06F 9/445* (2006.01)

(52) U.S. Cl.
CPC ............ *G06F 9/5072* (2013.01); *G06F 8/60* (2013.01); *G06F 8/61* (2013.01); *G06F 9/455* (2013.01); *G06F 9/445* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2006/0080413 | A1* | 4/2006 | Oprea | G06F 8/61 709/220 |
| 2008/0163194 | A1* | 7/2008 | Dias | G06F 9/5077 717/174 |
| 2011/0004676 | A1* | 1/2011 | Kawato | G06F 9/5044 709/221 |
| 2011/0035747 | A1* | 2/2011 | Machida | 718/100 |
| 2011/0209140 | A1* | 8/2011 | Scheidel | G06F 8/61 717/172 |
| 2012/0005646 | A1* | 1/2012 | Manglik | G06F 8/60 717/105 |
| 2013/0007254 | A1* | 1/2013 | Fries | H04L 43/0876 709/224 |
| 2013/0232497 | A1* | 9/2013 | Jalagam | G06F 9/5072 718/104 |
| 2013/0232498 | A1* | 9/2013 | Mangtani | G06F 9/5072 718/104 |

\* cited by examiner

*Primary Examiner* — Emerson Puente
*Assistant Examiner* — Benjamin Wu
(74) *Attorney, Agent, or Firm* — Dergosits & Noah, LLP; Todd A. Noah

(57) ABSTRACT

A method for automatically provisioning a virtual computing environment comprising a plurality of virtual computing nodes includes provisioning a virtual base node using base configuration information that includes a base endpoint that identifies interconnectivity parameters required to communicate with the virtual base node, and storing the base endpoint in an endpoint registry. The method further includes determining that a virtual first node depends on the virtual base node, and receiving the base endpoint from the endpoint registry. Thereafter, the virtual first node is provisioned using the received base endpoint and first configuration information for the virtual first node.

20 Claims, 7 Drawing Sheets

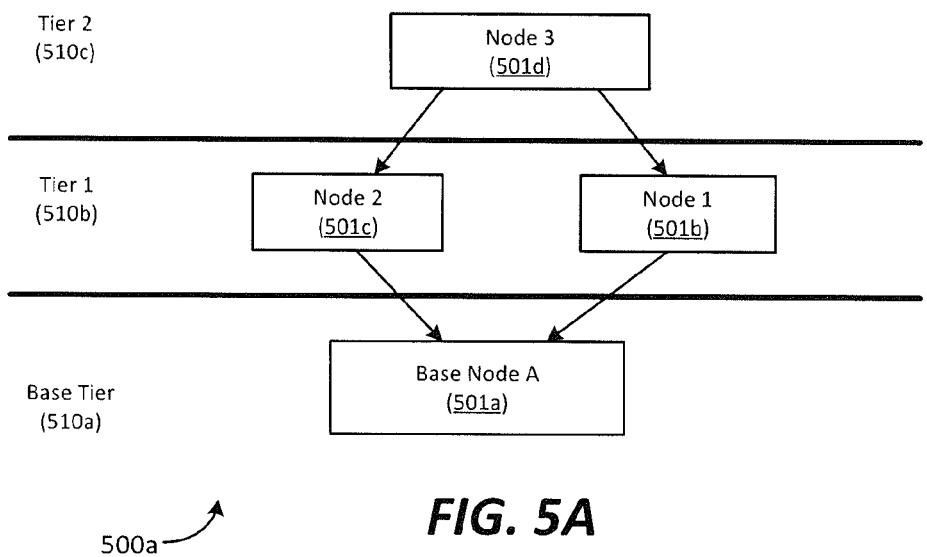
FIG. 5A
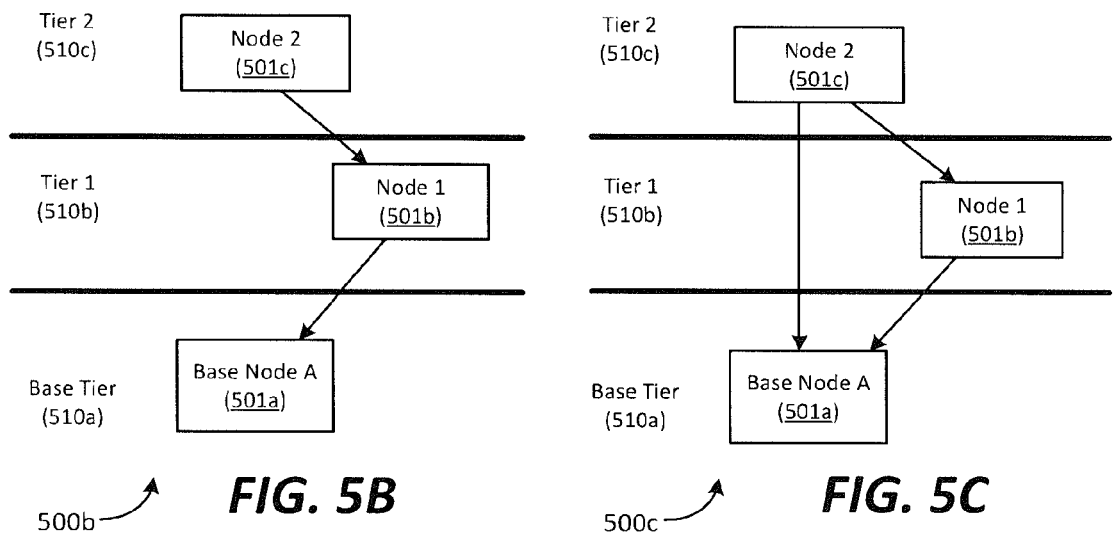
FIG. 5B  FIG. 5C

PROVISION A VIRTUAL ENVIRONMENT BASED ON TOPOLOGY OF VIRTUAL NODES, NODE DEPENDENCIES AND BASE NODE CONFIGURATION INFORMATION

BACKGROUND

An enterprise computing environment typically includes a plurality of interconnected computing nodes, which can be physical and/or virtual nodes. Physical computing nodes, i.e., physical machines, can be clustered and/or distributed, that is, they can physically reside in a single location or be distributed in several locations, communicatively coupled to one another by a network, e.g., the Internet or a private network. Virtual computing nodes, on the other hand, represent physical machines, and many virtual nodes can typically be hosted by one physical machine. By virtualizing its computing environment, an enterprise can more efficiently manage its physical computing resources. In addition, an enterprise that owns physical machines can optimize its investment by "renting" its excess computing capacity to another enterprise which does not own physical machines.

While the virtualization of a computing environment offers numerous advantages, provisioning such an environment can present serious challenges. For instance, many enterprises require services and applications that rely on other services/applications, which, in a physical or virtual world, reside in different physical/virtual computing nodes, such as servers. Each node must be configured to support its service/application. For example, when a node hosts a web application, the node must be configured as an application server; and when a node hosts a database service, the node must be configured as a database server. Accordingly, depending on the hosted service/application, each node must be provisioned with specific parameters that support the hosted service/application.

Moreover, in most cases, the interconnectivity and dependencies between applications and services, and therefore, between different nodes, can be very complex. For example, when an application depends on a database service, the application server must be able to connect to and/or communicate with the database server. Accordingly, when provisioning such an environment, physical or virtual, each node that hosts a service that depends on another service must be configured with the correct connectivity information so that the node can communicate with the other node(s) hosting the other service.

Due to the variety of server specific configurations, and to the complexity of deployment topologies, provisioning and/or modifying such an environment, on demand or at runtime, is a very difficult and error prone task.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIGS. 5A, 5B and 5C are block diagrams representing exemplary network topologies according to an exemplary embodiment.

DETAILED DESCRIPTION

Methods and systems for automatically provisioning a virtual computing environment comprising a plurality of virtual computing nodes are disclosed. According to an embodiment, a provisioning service is configured to receive a virtual topology that defines virtual nodes associated with hierarchical tiers, and that defines dependencies between the virtual nodes. Starting with the lowest tier, referred to as a base tier, the provisioning service provisions a virtual node in the base tier, referred to as a base node, using configuration information specific to the base node. The configuration information includes a base endpoint that identifies interconnectivity parameters required to communicate with the base node. In an embodiment, when the base node is provisioned, the provisioning service copies the base endpoint and stores it in an endpoint registry.

Once the nodes in the base tier are provisioned, the provisioning service provisions a virtual node(s) in a tier hierarchically above the base tier. In an embodiment, for a first node, the provisioning service can determine that the first node depends on the base node based on the virtual topology. When this is the case, the provisioning service can, in an embodiment, retrieve the base endpoint associated with the base node from the endpoint registry, and can provision the first node using the base endpoint and configuration information specific to the first node. In an embodiment, the first node's configuration information also includes an endpoint that identifies interconnectivity parameters required to communicate with the first node. When the first node is provisioned, the provisioning service copies the associated endpoint and stores it in the endpoint registry.

The provisioning service can be configured, in an embodiment, to proceed in this manner for each of the virtual nodes in each of the tiers. Accordingly, each of the nodes can be provisioned automatically according to the virtual topology, and the endpoint registry stores, in an embodiment, an endpoint for each of the plurality of virtual nodes. Thus, if the virtual topology is modified, the virtual nodes can be reprovisioned easily and automatically. For example, when the dependency of a node is modified from a first node to a second node, the provisioning service can be configured to automatically retrieve the second node's endpoint from the registry, and to reprovision the node using the retrieved endpoint. Similarly, when a new node is added to the virtual topology and is provisioned, the new node's endpoint is stored in the registry, and can be retrieved to reprovision nodes that depend on the new node.

Figure 1:
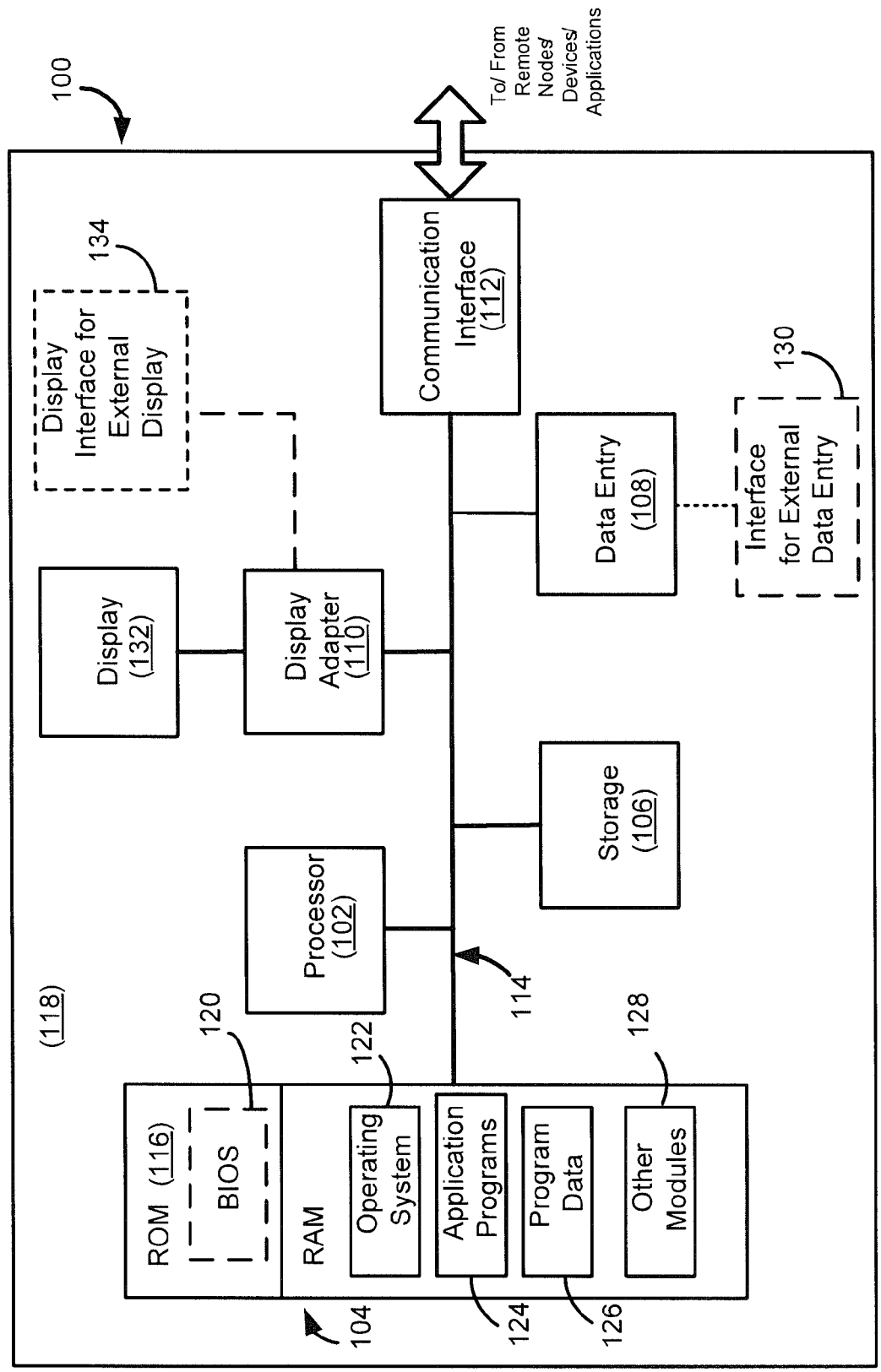
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a physical or virtual hardware device 100, including a processing unit 102, memory 104, storage 106, data entry module 108, display adapter 110, communication interface 112, and a bus 114 that couples elements 104-112 to the processing unit 102. While many elements of the described hardware device 100 can be physically implemented, many if not all elements can also be virtually implemented by, for example, a virtual computing node.

The bus 114 may comprise any type of bus architecture. Examples include a memory bus, a peripheral bus, a local bus, etc. The processing unit 102 is an instruction execution machine, apparatus, or device, physical or virtual, and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the physical or virtual hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the device 100.

The device 100 may operate in a networked environment using logical connections to one or more remote nodes (not shown) via communication interface 112. The remote node may be another physical or virtual computer, a server, a router, a peer device or other common network node, and typically includes many or all of the elements described above relative to the device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the device 100, or portions thereof, may be stored in a remote storage device, such as, for example, on a server. It will be appreciated that other hardware and/or software to establish a communications link between the device 100 and other devices may be used.

It should be understood that the arrangement of device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components can be realized, in whole or in part, by at least some of the components illustrated in the arrangement of device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
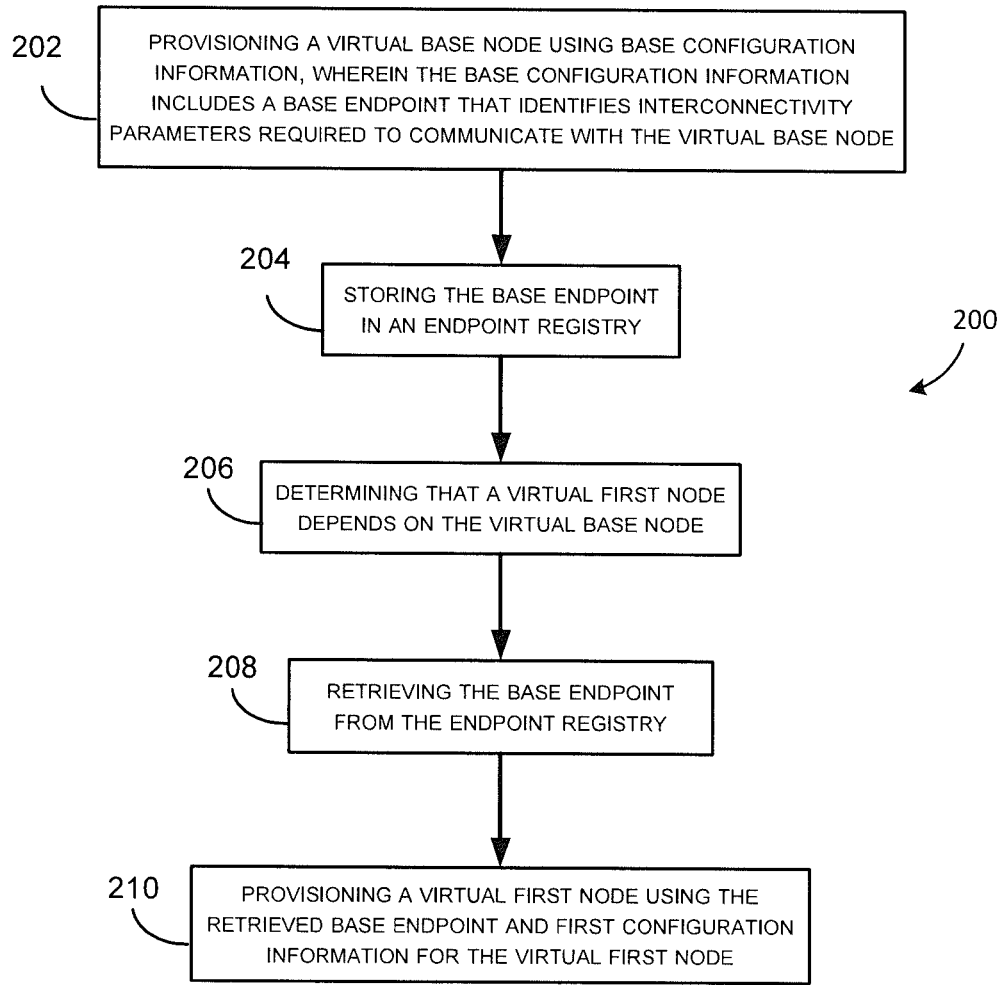
FIG. 2 is a flow diagram illustrating a method for automatically provisioning a virtual computing environment according to an exemplary embodiment.
Figure 3:
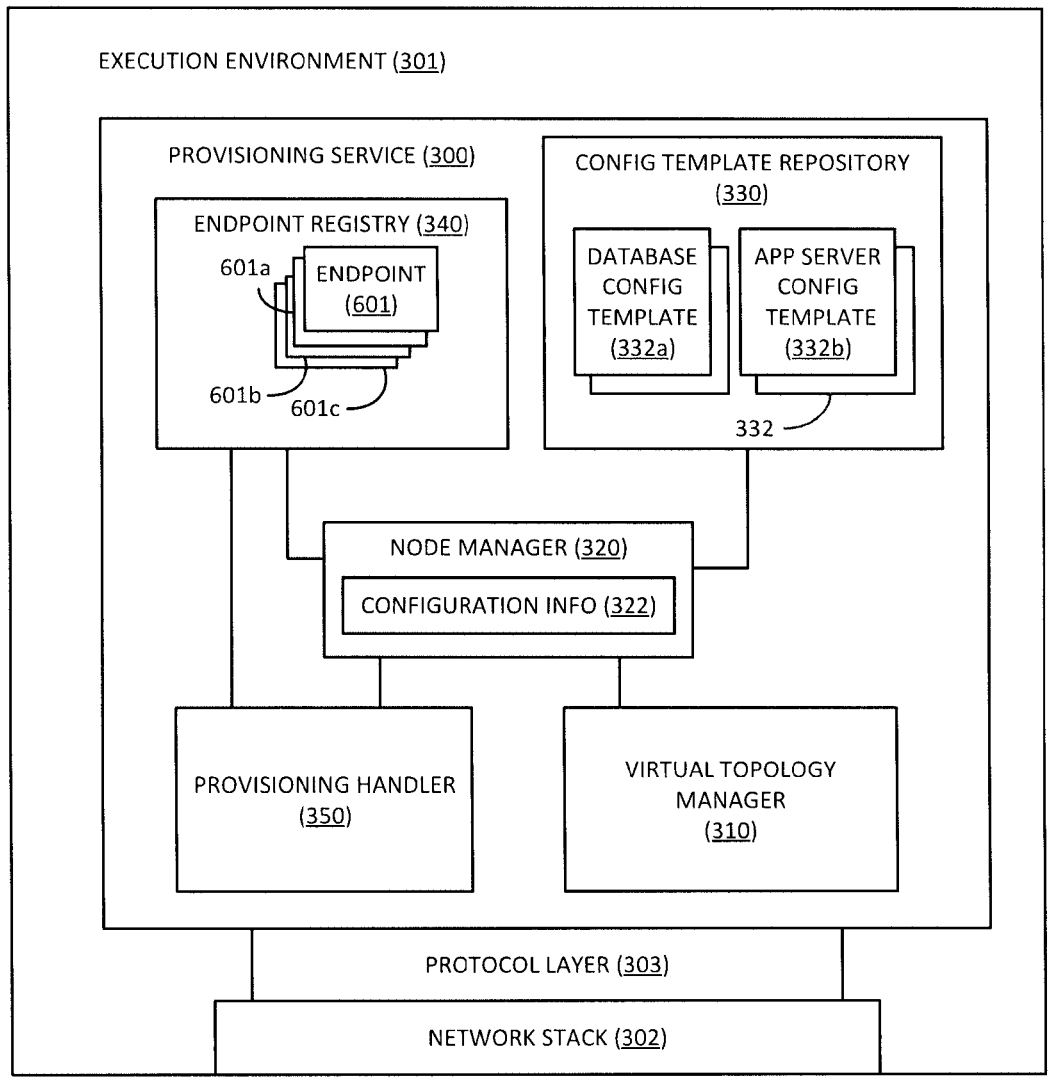
FIG. 3 is a block diagram illustrating a system for automatically provisioning a virtual computing environment according to an exemplary embodiment.

Referring now to FIG. 2, a flow diagram is presented illustrating a method for automatically provisioning a virtual computing environment comprising a plurality of virtual computing nodes according to an exemplary embodiment. FIG. 3 is a block diagram illustrating an exemplary system for automatically provisioning a virtual computing environment according to embodiments of the subject matter described herein. The method illustrated in FIG. 2 can be carried out by, for example, at least some of the components in the exemplary arrangement of components illustrated in FIG. 3. The arrangement of components in FIG. 3 may be implemented by some or all of the components of the device 100 of FIG. 1.

Figure 4:
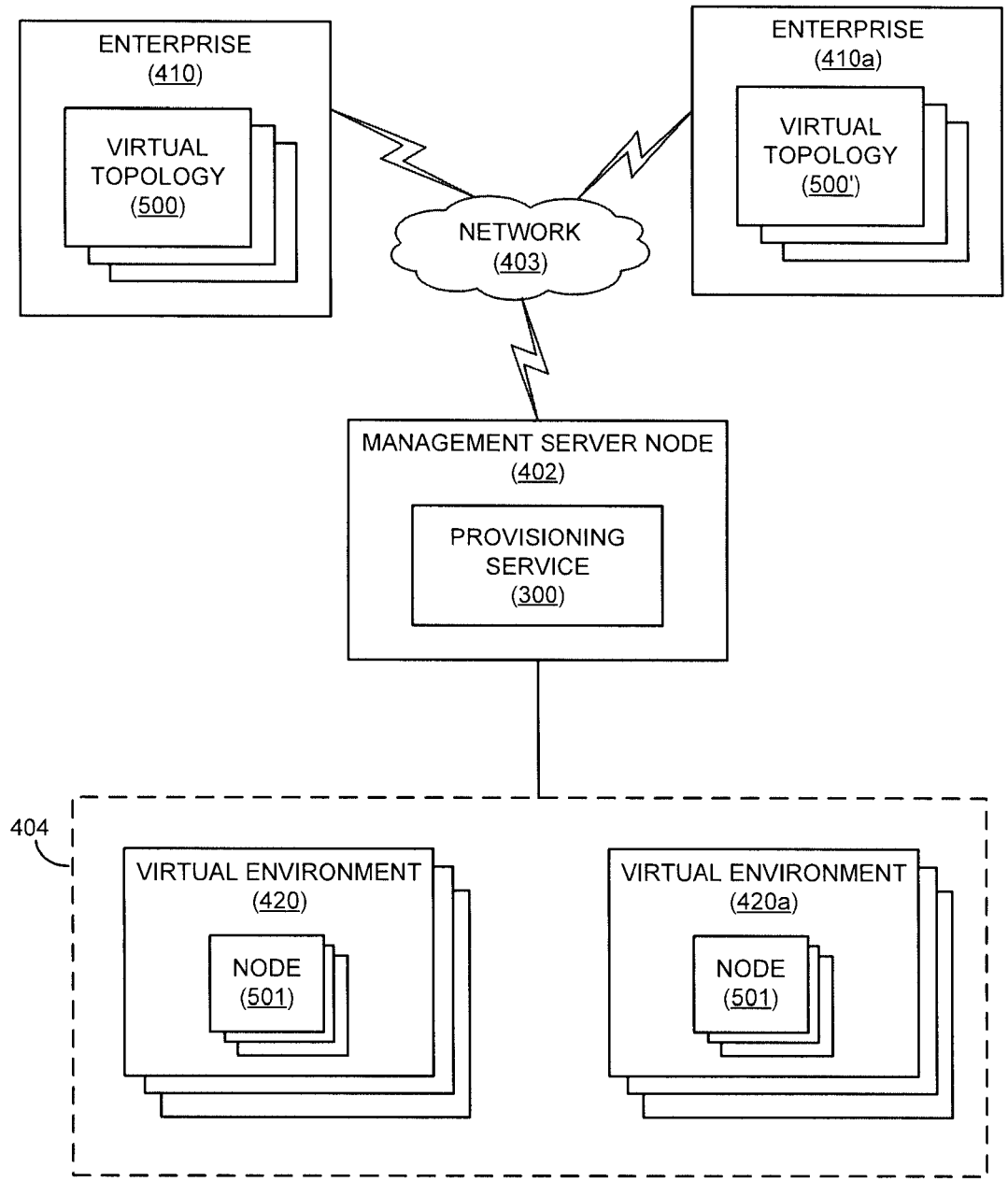
FIG. 4 illustrates a network in which a system for automatically provisioning a virtual computing environment can be implemented.

FIG. 3 illustrates components that are configured to operate within an execution environment hosted by a physical or virtual computer device and/or multiple computer devices, as in a distributed execution environment. For example, FIG. 4 illustrates a plurality of virtual computing environments 420, 420a that comprise a plurality of virtual computing nodes 501 communicatively coupled to and managed by a management server node 402. In an embodiment, the virtual computing environments 420, 420a can be created in a cloud computing environment 404 provided by an independent cloud service provider that leases physical and/or virtual cloud resources to different private enterprises 410, 410a for a fee. In that case, the management server node 402 can be a physical or virtual cloud resource in the public cloud environment 404 provided by the independent service provider. Alternatively, the management server node 402 can be in a demilitarized zone (not shown) associated with a secure enterprise network of an enterprise 410, 410a. In an embodiment, the management server node 402 can be configured to provide an execution environment configured to support the operation of the components illustrated in FIG. 3 and/or their analogs.

Illustrated in FIG. 3 is a provisioning service 300 including components adapted for operating in an execution environment 301. The execution environment 301, or an analog, can be provided by a node such as the management server node 402. The provisioning service 300 can include a configuration template repository 330 for storing configuration templates 332 for various types of services/applications hosted by the virtual computing nodes 501, including, for example, a database service, a content management service, an HTTP service, a J2ee application service, a mail service, and the like. The configuration templates 332 can be preloaded into the repository 330 in an embodiment. Alternatively, or in addition, in another embodiment, the provisioning service 300 can be configured to receive customized and/or general configuration templates 332 from an enterprise 410 over a public or private network 403.

According to an embodiment, the provisioning service 300 can also include a virtual topology manager 310 that is configured to receive a virtual topology 500 from an enterprise 410. In an embodiment, the virtual topology 500 is a blueprint of the virtual environment 420 and defines a plurality of virtual nodes 501 associated with a plurality of hierarchical tiers, and defines dependencies between the virtual nodes 501. According to an embodiment, at least one virtual node 501 can be associated with a tier, and a node in a tier can depend only on another node that is associated with a lower tier.

For example, FIG. 5A is a graphical representation of an exemplary virtual topology 500a that includes virtual nodes 501a-501d associated with three (3) hierarchical tiers 510a-510c. The virtual topology 500a includes a virtual base node 501a associated with a lowest base tier 510a, and virtual nodes 501b-501d associated with at least one tier 510b, 510c hierarchically above the lowest base tier 510a. The virtual base node 501a is an independent node that does not depend on another node, i.e., the virtual base node 501a hosts a service/application that is not configured to invoke or depend on other services/applications. An exemplary base node 501a can be, in an embodiment, a database server, a mail server, and/or an application server.

Virtual nodes 501c-501c1 associated with higher tiers 510b, 510c above the lowest base tier 510a depend on at least one node in at least one lower tier. For example, Node 3 501d associated with tier 2 510c depends on Node 1 501b and Node 2 501c, both associated with tier 1 510b, and Node 2 501c depends on Base Node A 501a associated with the base tier 510a. In an embodiment, when a node, e.g., Node 3 501d, depends on another node, e.g., Node 1 501b, the dependent node 501d hosts an application/service that is configured to invoke or depend on a service/application hosted by the other node 501b. Thus, when the dependent node 501d is provisioned, it must be configured with the other node's connectivity information to connect to the other node 501*b*. Exemplary dependent nodes can be, in an embodiment, web servers, content management servers, application servers, and/or proxy servers.

According to an embodiment, the virtual topology 500*a* in FIG. 5A can represent a simple web service environment, where Base Node A 501*a* is a database server, Node 1 501*b* and Node 2 501*c* are application servers, and Node 3 501*d* is a proxy server. In this environment, the proxy server 510*d* sends service requests to both of the application servers 501*b*, 501*c*, which in turn, send requests to the database server 510*a*. Accordingly, the proxy server 510*d* depends on the applications servers 501*b*, 501*c*, which depend on the database server 501*a*.

According to an embodiment, an enterprise 410 can provide more than one virtual topology 500 corresponding to more than one virtual environment 420. For example, different virtual topologies 500 can be implemented for different divisions or departments of an enterprise 410. In another embodiment, the provisioning service 300 can be configured to provision and manage another set of virtual environments 420*a* for another enterprise 410*a*. The provisioning service 300 can be configured, in an embodiment, to receive the virtual topology 500, 500' over the private and/or public network 403, such as the Internet, via a network stack 302 in the execution environment 301. The network stack 302 can be configured to provide the virtual topology 500, 500' to a communication protocol layer 303, which in turn can pass the information to the virtual topology manager 310.

When the virtual topology, e.g., 500*a*, is received, the virtual topology manager 310 can be configured, in an embodiment, to analyze the virtual topology 500*a* to identify each virtual node 501*a*-501*d* associated with each tier 510*a*-510*c*, to determine which type of service/application each virtual node hosts, and to determine dependencies between the nodes 501*a*-501*d*. According to an embodiment, once the virtual topology 500*a* has been analyzed, the node provisioning process begins starting with nodes associated with the lowest base tier 510*a* and continuing with nodes associated with a next higher tier 510*b* until all of the nodes 501*a*-501*d* are provisioned.

Accordingly, with reference to FIG. 2, in block 202, a virtual base node is provisioned using base configuration information, which includes a base endpoint that identifies interconnectivity parameters required to communicate with the virtual base node. According to an embodiment, the provisioning service 300 includes a provisioning handler component 350 configured for provisioning a virtual base node, e.g., Base Node A 501*a*, using base configuration information that includes a base endpoint that identifies interconnectivity parameters required to communicate with the virtual base node 501*a*.

In an embodiment, when the virtual topology, e.g., 500*a*, is received and analyzed, the virtual topology manager 310 can be configured to select a virtual base node, e.g., 501*a*, and to invoke a node manager component 320 in the provisioning service 300. The node manager component 320 can be configured, in an embodiment, to retrieve a configuration template 332 corresponding to the type of service/application hosted by the virtual base node 501*a*. For example, when the virtual base node 501*a* is a database server, the node manager component 320 can be configured to retrieve a database configuration template 332*a* from the configuration template repository 330.

According to an embodiment, the configuration template 332 includes and/or identifies, in general, all data needed to provision a virtual node 501 according to a service associated with the configuration template 332. In an embodiment, the configuration template 332 can include and/or identify the appropriate software, e.g., operating system, middleware and applications, for the service/application hosted by the virtual node 501. For example, the database configuration template 332*a* can include and/or identify all data needed to provision a database server, while the application configuration template 332*b* can include and/or identify all data needed to provision an application server. In an embodiment, the node manager 320 can be configured to use the retrieved configuration template 332 to generate configuration information 322 for the service/application hosted by the virtual base node 501*a*.

In an embodiment, the node manager 320 can be configured to generate a base endpoint 601*a* associated with the virtual base node 501*a* that identifies interconnectivity parameters associated with the virtual base node 501*a* that are required to communicate with the base node 501*a*. For example, the interconnectivity parameters can identify a host, a communication port, a communication protocol, a username, and/or a password. In some cases, a connection URL and/or an encryption type and keys can also be identified. According to an embodiment, the base endpoint 601*a* of the virtual base node 501*a* can be associated with the virtual base node 501*a* because the combination of the interconnectivity parameters is specific to the base node 501*a*.

According to an embodiment, the node manager 320 can be configured to collect connectivity information relating to other nodes 501 upon which the virtual base node 501*a* depends. Nevertheless, because the virtual base node 501*a* is associated with the lowest base tier 510*a*, it does not depend on another node, and therefore, no such connectivity information exists. According to an embodiment, the node manager 320 can be configured to include the base endpoint 601*a* in the configuration information 322 for the virtual base node 501*a*, and can be configured to provide the configuration information 322 to the provisioning handler component 350.

According to an embodiment, the provisioning handler component 350 can be configured to provision the virtual base node 501*a* using the configuration information 322 for the base node 501*a* received from the node manager 320. For example, in an embodiment, the provisioning handler component 350 can be configured to "load" the identified software, e.g., the operation system, device drivers, middleware and applications, to customize and configure the system and the software to create a boot image for the server, and to perform other provisioning tasks necessary to prepare the virtual base node 501*a* for operation.

Referring again to FIG. 2, once the virtual base node 501*a* is provisioned, the base endpoint 601*a* is stored in an endpoint registry 340 associated with the provisioning service 300 in block 204. In an embodiment, the provisioning handler component 350 can be configured to store the base endpoint 601*a* in the endpoint registry 340 after it has provisioned the virtual base node 501*a*. Alternatively, the node manager component 320 can be configured to copy the base endpoint 601*a* when it is generated, and to store it in the endpoint registry 340.

In an embodiment, the provisioning handler 350 can be configured to provision all virtual nodes 501 associated with the lowest base tier 510*a* in the manner described above, and to store each of the corresponding base endpoints 601 in the endpoint registry 340. When each of the virtual nodes 501 in the lowest base tier 510*a* are provisioned, the virtual topology manager 310 can be configured to progress to a next tier immediately above the completed base tier 510*a*, and to select a virtual first node, e.g., Node 1 501b, associated with the next tier immediately above the base tier 510a, i.e., the first tier 510b, for provisioning.

Referring again to FIG. 2, when a virtual first node 501c is selected, the virtual topology manager 310 can be configured to determine, in block 206, that the virtual first node 501b depends on the virtual base node 501a. According to an embodiment, the virtual topology manager 310 can be configured to make this determination based on the virtual topology, e.g., 500a, which as stated above, defines the dependencies between the virtual nodes 501a-501d. For example, the virtual topology 500a represented in FIG. 5A indicates that the virtual first node, e.g., Node 1 501b, depends on the virtual base node, Base Node A 501a. Once the virtual first node 501b is selected and its dependency determined, the virtual topology manager 310 can invoke the node manager component 320.

In an embodiment, when invoked, the node manager component 320 can retrieve a configuration template 332 corresponding to the type of service/application hosted by the virtual first node 501b, and can use the retrieved configuration template 332 to generate configuration information 322 for the service/application hosted by the virtual first node 501b. A first endpoint 601b associated with the virtual first node 501b is also generated and included in the configuration information 322. Similar to the base endpoint 601a, the first endpoint 601b identifies interconnectivity parameters associated with the virtual first node 501b that are required to communicate with the virtual first node 501b.

As stated above, in addition to generating the endpoint 601, the node manager component 320 collects connectivity information relating to node(s) 501 on which the virtual first node 501b depends. In this case, the virtual first node 501b depends on the virtual base node 501a, and therefore, the connectivity information relating to the virtual base node 501a is collected. In an embodiment, the base endpoint 601a includes the connectivity information relating to the virtual base node 501a.

Accordingly, referring again to FIG. 2, the node manager component 320 is configured to retrieve the base endpoint 601a associated with the virtual base node 501a from the endpoint registry 340 in block 208. In an embodiment, the node manager 320 can be configured to provide the retrieved base endpoint 601a and the configuration information 322 for the virtual first node 501b to the provisioning handler component 350, which is configured for provisioning the virtual first node 501b in block 210. According to an embodiment, the first configuration information 322 for the virtual first node 501b and the base endpoint 601a are used to provision the virtual first node 501b. As described above, once the virtual first node 501b is provisioned, the first endpoint 601b is stored in the endpoint registry 340 along with the base endpoint 601a.

Figure 6B:
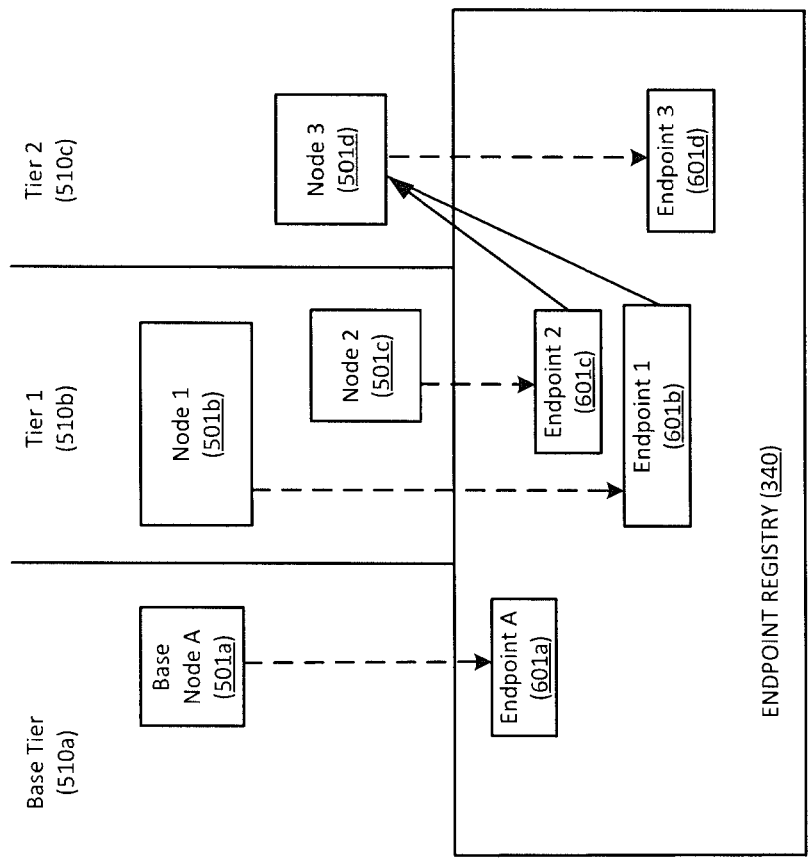
FIGS. 6A-6D are block diagrams illustrating representations of node provisioning according to an exemplary embodiment.
Figure 6A:
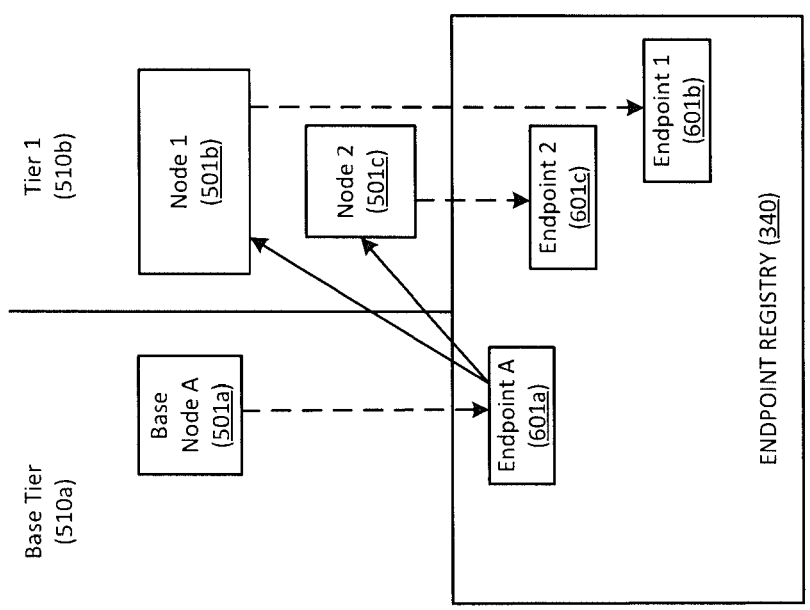

FIG. 6A is a graphical representation of the provisioning of the base virtual node, e.g., Base Node A 501a, the virtual first node, e.g., Node 1 501b, and a virtual second node, e.g., Node 2 501c, of FIG. 5A. As is shown in FIG. 6A, Node 1 501b is provisioned using Endpoint A 601a associated with Base Node A 501a on which Node 1 501b depends (as indicated by the solid arrow from Endpoint A 601a to Node 1 501b). In addition, Endpoint 1 601b associated with Node 1 501b is stored in the endpoint registry 340 (as indicated by the dashed arrow from Node 1 501b to Endpoint 1 601b).

In an embodiment, the provisioning handler 350 can be configured to provision the virtual second node, e.g., Node 2 501c, in the manner described above with regard to the virtual first node 501b. As is shown in the topology 500a represented in FIG. 5A, Node 1 501b and Node 2 501c depend on the same virtual base node, e.g., Base Node A 501a, and therefore, base Endpoint A 601a is retrieved again and used again to provision Node 2 501c, as is shown in FIG. 6A. As described above, once the virtual second node 501c is provisioned, its endpoint 601c is stored in the endpoint registry 340 along with the Endpoint 1 601b and base Endpoint A 601a.

As before, the provisioning handler 350 can be configured to provision all virtual nodes 501 associated with the first tier 510b in the manner described above, and to store each of the corresponding base endpoints 601 in the endpoint registry 340. When each of the virtual nodes 501 in the first tier 510b are provisioned, the virtual topology manager 310 can be configured to provision virtual nodes 501 associated with a second tier 510c immediately above the completed first tier 510b.

For example, referring again to the topology 500a in FIG. 5A, the virtual topology manager 310 can be configured to select a virtual third node, e.g., Node 3 501d, associated with the second tier 510b, and to determine, based on the topology 500a, that Node 3 501d depends on two virtual nodes, Node 1 501b and Node 2 501c, in a lower tier 510b. In this case, two endpoints, Endpoint 1 601b and Endpoint 2 601c, are retrieved and used to provision Node 3 501d, as is shown in FIG. 6B. Once the virtual third node 501d is provisioned, its endpoint 601d is stored in the endpoint registry 340 along with the other endpoints 601a-601c.

In an embodiment, when each of the virtual nodes 501 in a tier are provisioned, the virtual topology manager 310 can be configured to provision virtual nodes 501 associated with a next tier immediately above the completed tier, and to continue with each progressively higher tier until each of the plurality of virtual nodes 501 of the virtual environment 420 is provisioned. When provisioning of the virtual environment 420 is completed, endpoints 601 associated with each of the plurality of virtual nodes 501 are stored in the endpoint repository 340. Accordingly, when the virtual topology 500 of the virtual environment 420 is modified, and the dependencies between the nodes 501 are changed, the provisioning service 300 can easily reprovision the virtual environment 420 by receiving and using the appropriate endpoints 601 to reprovision the affected virtual nodes 501.

Figure 6D:
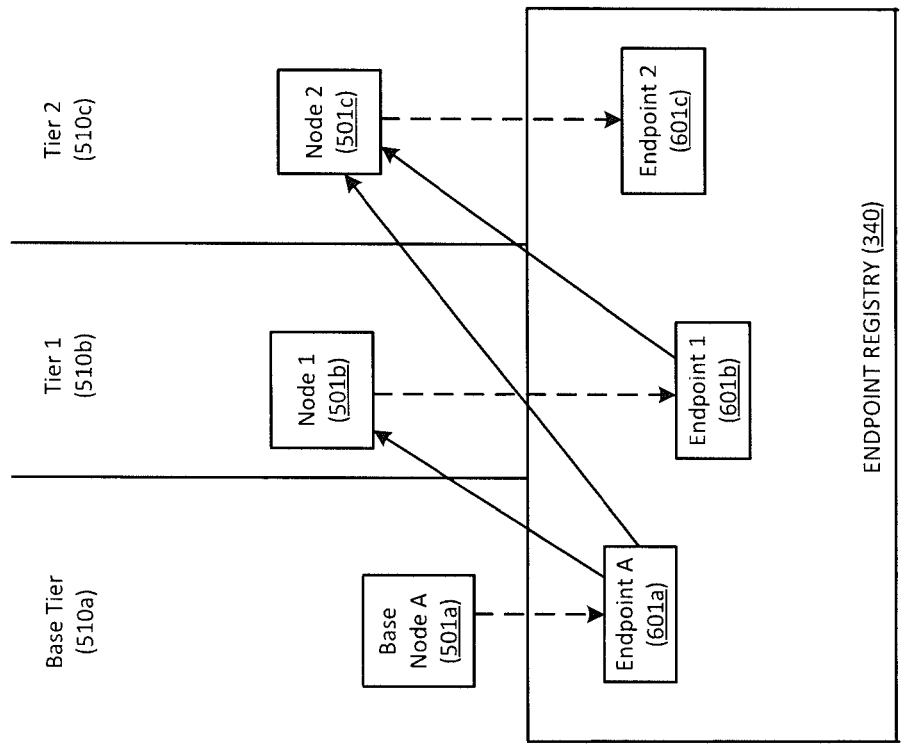
Figure 6C:
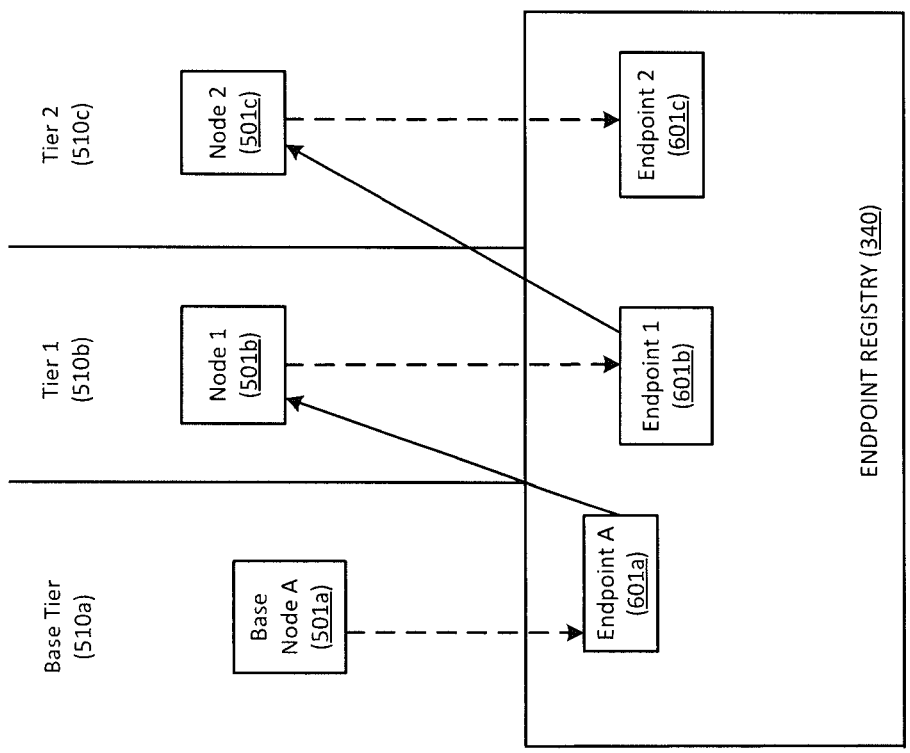

For example, FIG. 5B is a graphical representation of another virtual topology 500b where Node 2 501c depends on Node 1 501b, and Node 1 501b depends on Base Node A 501a. FIG. 6C is a graphical representation of the provisioning of the virtual nodes 501a-501c of FIG. 5B, and illustrates that Node 1 501b is provisioned using Endpoint A 601a of Base Node A 501a, and Node 2 501c is provisioned using Endpoint 1 601b of Node 1 501b. In an embodiment, the topology 500b can be modified so that Node 2 501c depends on Base Node A 501a in addition to Node 1 501b. FIG. 5C is a graphical representation of the modified topology 500c. When the provisioning service 300 receives an indication modifying the topology in this manner, the provisioning service 300 can automatically reprovision the affected node, e.g., Node 2 501c, by receiving the endpoints 601 of Base Node A 501a and Node 1 501b from the endpoint registry 340, and using the retrieved endpoints 601a, 601b to reprovision Node 2 501c. FIG. 6D graphically illustrates the reprovisioning of Node 2 501c according to an exemplary embodiment.

According to aspects of exemplary embodiments, an endpoint that identifies interconnectivity parameters required to communicate with a virtual node is generated for each of a plurality of virtual nodes in a virtual environment, and is stored in an endpoint repository. Using the endpoints, any virtual environment represented by a virtual topology can be easily and automatically provisioned. Moreover, when the virtual topology is modified, the affected nodes can be reprovisioned easily and automatically as well.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for automatically provisioning a virtual computing environment comprising a plurality of virtual computing nodes, the method comprising:
   receiving, a virtual topology associated with at least one virtual environment, the virtual topology comprising a plurality of virtual nodes;
   analyzing the received virtual topology to identify dependencies between the plurality of nodes and at least one of a service and an application hosted by each virtual node;
   identifying a virtual base node from the virtual topology, the virtual base node being one of the plurality of virtual nodes;
   provisioning the identified virtual base node using base configuration information, wherein the base configuration information includes a base endpoint that identifies interconnectivity parameters required to communicate with the virtual base node;
   storing the base endpoint in an endpoint registry;
   determining, from the virtual topology, that a virtual first node depends on the virtual base node;
   retrieving the base endpoint from the endpoint registry based on the determination that the virtual first node depends on the virtual base node;
   provisioning the virtual first node using the retrieved base endpoint and first configuration information for the virtual first node, the first configuration information including a first endpoint; and
   storing a first endpoint in the endpoint registry.

2. The method of claim 1 further comprising:
   determining that a virtual second node also depends on the virtual base node;
   receiving the base endpoint from the endpoint registry; and
   provisioning the virtual second node using the retrieved base endpoint and second configuration information for the virtual second node.

3. The method of claim 2 wherein the first endpoint identifies interconnectivity parameters required to communicate with the virtual first node, and the second configuration information includes a second endpoint that identifies interconnectivity parameters required to communicate with the second virtual node, the method further comprising storing the first endpoint and the second endpoint in the endpoint registry.

4. The method of claim 3 further comprising:
   determining that a virtual third node depends on the virtual first node and the virtual second node;
   receiving the first endpoint and the second endpoint from the endpoint registry; and
   provisioning the virtual third node using the retrieved first endpoint and second endpoint, and third configuration information for the virtual third node.

5. The method of claim 4 wherein the virtual third node represents a proxy server, the virtual first and second nodes represent first and second application servers, and the virtual base node represents a database server.

6. The method of claim 1 wherein the first endpoint identifies interconnectivity parameters required to communicate with the virtual first node.

7. The method of claim 6 further comprising:
   determining that a virtual second node depends on the virtual first node;
   receiving the first endpoint from the endpoint registry; and
   provisioning the virtual second node using the retrieved first endpoint, and second configuration information for the virtual second node.

8. The method of claim 7 further comprising:
   receiving an indication that the virtual second node depends on the virtual base node and on the virtual first node;
   receiving the base endpoint and the first endpoint from the endpoint registry; and
   reprovisioning the virtual second node using the retrieved endpoints.

9. The method of claim 1 wherein the interconnectivity parameters identify at least one of a host, a port, a protocol, a username, and a password.

10. A computer program product comprising a non-transitory machine-readable medium carrying one or more sequences of instructions for automatically provisioning a virtual computing environment comprising a plurality of virtual computing nodes, which instructions, when executed by one or more processors, cause the one or more processors to carry out the steps of:
    receiving, a virtual topology associated with at least one virtual environment, the virtual topology comprising a plurality of virtual nodes;
    analyzing the received virtual topology to identify dependencies between the plurality of nodes and at least one of a service and an application hosted by each virtual node;

identifying a virtual base node from the virtual topology, the virtual base node being one of the plurality of virtual nodes;

provisioning the identified virtual base node using base configuration information, wherein the base configuration information includes a base endpoint that identifies interconnectivity parameters required to communicate with the virtual base node;

storing the base endpoint in an endpoint registry;

determining, from the virtual topology, that a virtual first node depends on the virtual base node;

retrieving the base endpoint from the endpoint registry based on the determination that the virtual first node depends on the virtual base node;

provisioning the virtual first node using the retrieved base endpoint and first configuration information for the virtual first node, the first configuration information including a first endpoint; and storing a first endpoint in the endpoint registry.

11. A system for automatically provisioning a virtual computing environment comprising a plurality of virtual computing nodes, the apparatus comprising:

a processor; and one or more stored sequences of instructions which, when executed by the processor, cause the processor to carry out the steps of:

receiving, a virtual topology associated with at least one virtual environment, the virtual topology comprising a plurality of virtual nodes;

analyzing the received virtual topology to identify dependencies between the plurality of nodes and at least one of a service and an application hosted by each virtual node;

identifying a virtual base node from the virtual topology, the virtual base node being one of the plurality of virtual nodes;

provisioning the identified virtual base node using base configuration information, wherein the base configuration information includes a base endpoint that identifies interconnectivity parameters required to communicate with the virtual base node;

storing the base endpoint in an endpoint registry;

determining, from the virtual topology, that a virtual first node depends on the virtual base node;

retrieving the base endpoint from the endpoint registry based on the determination that the virtual first node depends on the virtual base node;

provisioning the virtual first node using the retrieved base endpoint and first configuration information for the virtual first node, the first configuration information including a first endpoint; and storing a first endpoint in the endpoint registry.

12. The system of claim 11 further comprising stored instructions for:

determining that a virtual second node also depends on the virtual base node;

receiving the base endpoint from the endpoint registry; and provisioning the virtual second node using the retrieved base endpoint and second configuration information for the virtual second node.

13. The system of claim 12 wherein first endpoint that identifies interconnectivity parameters required to communicate with the virtual first node, and the second configuration information includes a second endpoint that identifies interconnectivity parameters required to communicate with the second virtual node, the system further comprising stored instructions for storing the first endpoint and the second endpoint in the endpoint registry.

14. The system of claim 13 further comprising stored instructions for:

determining that a virtual third node depends on the virtual first node and the virtual second node;

receiving the first endpoint and the second endpoint from the endpoint registry; and provisioning the virtual third node using the retrieved first endpoint and second endpoint, and third configuration information for the virtual third node.

15. The system of claim 14 wherein the virtual third node represents a proxy server, the virtual first and second nodes represent application servers, and the virtual base node represents a database server.

16. The system of claim 15 wherein the virtual base node is provisioned prior to provisioning any virtual nodes that depend on the virtual base node, and the virtual first node is provisioned prior to provisioning any virtual nodes that depend on the virtual first node.

17. The system of claim 11 wherein the first configuration information includes a first endpoint that identifies interconnectivity parameters required to communicate with the virtual first node.

18. The system of claim 17 further comprising stored instructions for:

determining that a virtual second node depends on the virtual first node;

receiving the first endpoint from the endpoint registry; and provisioning the virtual second node using the retrieved first endpoint, and second configuration information for the virtual second node.

19. The system of claim 18 further comprising stored instructions for:

receiving an indication that the virtual second node depends on the virtual base node and on the virtual first node;

receiving the base endpoint and the first endpoint from the endpoint registry; and reprovisioning the virtual second node using the retrieved endpoints.

20. The system of claim 11 wherein the interconnectivity parameters identify at least one of a host, a port, a protocol, a username, and a password.

* * * * *